Patented June 6, 1939

2,161,198

UNITED STATES PATENT OFFICE 2,161,198

INSULIN PREPARATION

Laszlo Reiner, Mount Vernon, N. Y., assignor to Burroughs Wellcome & Co. (U. S. A.) Inc., New York, N. Y., a corporation of New York No Drawing. Application February 1, 1937, Serial No. 123,487

10 Claims. (Cl. 167—75)

This invention relates to an improved insulin preparation and to a method of making the same and more particularly to an insulin preparation for injection into the human body to produce a quick-acting, prolonged lowering of the blood sugar content.

Insulin, the blood sugar lowering hormonal principle of the pancreas, has the property of acting quickly and at times somewhat violently when injected sub-cutaneously into the human body. The blood sugar lowering effect of usual doses may last from three to six hours, seldom longer. Consequently, diabetic patients require several injections daily, usually two or three, sometimes four.

An object of this invention is to overcome the above mentioned disadvantage inherent in insulin and to provide an insulin preparation in a form such that the insulin acts more slowly and remains effective for a substantially longer period of time.

Another object is to provide an insulin preparation in which better and more efficient utilization of the insulin is obtained.

Another object of the invention is to provide a preparation of the above type which not only retains its effect for long periods of time, but also acts quickly when it is first injected into the body so that immediate and prolonged beneficial results are obtained thereby.

Another object is to provide a simple, dependable and commercially practical process for making the above mentioned insulin preparation.

Various other objects and advantages will be apparent as the nature of the invention is more fully disclosed.

In accordance with the present invention, I have found that quick acting and prolonged lowering of the blood sugar content can be obtained by combining the insulin with globin, the animal protein occurring in hemoglobin, to form labile compounds or compositions from which the insulin is slowly released.

Human globin is preferred, although globin from other sources, such as ox globin or rabbit globin, may be used. The insulin and globin are mixed in proportions adapted to produce the most beneficial results and are used in the form of a precipitate in a suitable electrolyte. The rate of activity of the insulin can be controlled by varying the ratio of globin and insulin and the pH value of the electrolyte, the higher proportion of insulin being adapted to produce a quicker action and vice versa. The pH value is made such that the dissociation or decomposition of the composition and the release of the insulin takes place at the desired rate.

In some instances zinc may be combined with the insulin-globin composition to increase the activity of the insulin and to assist in producing the desired combination between the insulin and globin.

The insulin-globin composition can be made by dissolving the insulin in a dilute acid such as HCl, and dissolving the globin in a weak, dilute acid and/or buffer such as $KH_2PO_4$, $NaH_2PO_4$ acetate buffer, HCl or other acid having a pH value greater than 2. These solutions are mixed to form a clear solution in which the insulin-globin composition is formed. The latter is precipitated by addition of $Na_2HPO_4$ or other weak base to increase the pH value of the electrolyte to the point at which precipitation takes place. This solution, containing the white precipitate, may be used as such or it may be diluted with water or by solution of a zinc salt and/or cresol. The zinc is useful for increasing the activity of the insulin and makes the insulin-globin composition more stable. The cresol assists in maintaining the stability of the solution and at the same time acts as a disinfectant.

This preparation has sufficient stability to be kept for a long period of time, which is an important feature in the commercial handling thereof. It has been found that, when this solution is injected into the human body, a quick acting and prolonged effect is obtained such that one injection may be used in place of several of the usual insulin injections. Although this preparation is effective over a longer period of time than pure insulin, it has been found that it also causes a considerable lowering of the blood sugar which is comparable to that of ordinary insulin acting for a short time only.

I believe that the insulin and globin are combined to form a comparatively labile compound which I term globin insulinate. The combination takes place in various proportions and the stability of the resulting compound or composition can be controlled by varying the pH value of the electrolyte in which the precipitate is suspended. I attribute the beneficial action to the fact that the globin insulinate probably dissociates rather slowly to gradually release the insulin. I am not limiting myself to this explanation, however, as it is possible that the insulin and globin do not form a true chemical compound and that the above mentioned result may be due to other characteristics. The term "globin insulinate" is used herein to refer to the globin-insulin composition, whether a compound or a mixture, and to the reaction products of globin and insulin and it is to be interpreted accordingly.

In general, good effects have been obtained by using a proportion of globin equal to form .2 to 2.0 times that of the pure insulin or its equivalent and a total salt concentration less than that corresponding to ⅛ N NaCl and with a pH value between 5 and 8. It is usually advantageous to make the preparation from a globin which is homologous (not antigenic) to the species in which it is intended to be used. Care should be taken in the preparation of the globin to prevent excess denaturization, although preparations made with denatured globin show some of the desired effect.

Example

As a specific example, 50 mg. of pure insulin or its equivalent may be dissolved in about 10 cc. of N/100 HCl. This solution may be mixed with about 5 cc. of a solution of globin containing about 64 mg. globin and 22.5 mg. $KH_2PO_4$. The globin insulinate is precipitated from this solution as a white precipitate by the addition of about 2.5 cc. of a $Na_2HPO_4$ solution containing about 30 mg. of $Na_2HPO_4$. The solution may be diluted to about 25 cc. with water or with a solution of a zinc salt and cresol sufficient to make the final concentration about .3% cresol and .01% zinc. After a few minutes standing, the pH value stabilizes at about 6.

In the above example, it is to be understood that the electrolytes mentioned may be replaced by other convenient combinations of electrolytes, such as calcium, magnesium, copper, cadmium, cobalt, nickel and manganese salts and/or a buffer having a buffering capacity in the same pH range as the buffer systems mentioned above. Other substances or solvents mixable with water, such as alcohol, glycerol, triacetin, ethyleneglycol, ethanolamine and the like, can be added in various proportions to suit special purposes. Furthermore, the proportions may be varied within comparatively wide limits to control the ratio of the insulin, globin and zinc within the range referred to above.

While a specific embodiment of the invention has been set forth for purposes of illustration, it will be understood that various changes and modifications may be made therein and that the invention is capable of various uses, as will be apparent to a person skilled in the art. The invention is, accordingly, to be limited only in accordance with the following claims when interpreted in view of the prior art.

What is claimed is:

1. A therapeutically active product comprising globin insulinate.

2. A therapeutically active product comprising globin insulinate and zinc.

3. A therapeuticaly active product comprising globin insulinate as a precipitate in an electrolyte.

4. A therapeutically active product comprising a globin insulinate composition in which the globin is present in a proportion between .2 and 2.0 times the amount by weight of the insulin content.

5. A therapeutically active product comprising a globin insulinate composition in which the globin is present in a proportion between .2 and 2.0 times the amount by weight of the insulin content and containing less than .3 mg. of zinc per 2 mg. of insulin content.

6. The method of producing a therapeutically active preparation which comprises forming a globin insulinate composition in solution and precipitating said composition.

7. A method of making a therapeutically active preparation which comprises making a solution of insulin and globin in which the globin is present in a quantity of from .2 to 2.0 times the quantity of insulin content by weight, to form a globin-insulinate composition and treating the solution to precipitate said composition.

8. The method of making a therapeutically active preparation which comprises dissolving insulin in a weak acid, mixing the same with a solution of globin in an electrolyte to form a clear solution, and adding a base in quantities to precipitate globin insulinate.

9. The method of making a therapeutically active preparation which comprises dissolving insulin in a weak acid, mixing the same with a solution of globin in an electrolyte to form a clear solution, adding a base in quantities to precipitate globin insulinate and adding to the mixture a solution of a zinc salt in quantities such that the resultant zinc content is less than .3 mg. per 2 mg. of pure insulin.

10. The method of making a therapeutically active preparation which comprises mixing a solution of insulin with a solution of globin to form a globin insulinate composition.

LASZLO REINER.